(12) United States Patent
Berg et al.

(10) Patent No.: US 11,655,736 B2
(45) Date of Patent: May 23, 2023

(54) COMBINED CYCLE POWER PLANT WITH IMPROVED EFFICIENCY

(71) Applicant: General Electric Technology GmbH, Baden (CH)

(72) Inventors: Klara Berg, Brugg (CH); Mariah Couzzi-Carneiro, Dietikon (CH); Paul Drouvot, Village-Neuf (FR); Torbjörn Stenström, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 33 days.

(21) Appl. No.: 17/170,266

(22) Filed: Feb. 8, 2021

(65) Prior Publication Data

US 2021/0180473 A1 Jun. 17, 2021

Related U.S. Application Data

(62) Division of application No. 14/523,085, filed on Oct. 24, 2014, now Pat. No. 10,914,200.

(30) Foreign Application Priority Data

Oct. 31, 2013 (EP) .................................. 13191037

(51) Int. Cl.
*F01K 17/00* (2006.01)
*F01K 17/02* (2006.01)
*F01K 23/10* (2006.01)

(52) U.S. Cl.
CPC ............ *F01K 17/025* (2013.01); *F01K 17/00* (2013.01); *F01K 23/10* (2013.01); *F01K 23/101* (2013.01); *Y02E 20/14* (2013.01); *Y02E 20/16* (2013.01)

(58) Field of Classification Search
CPC ........ F01K 23/04; F01K 23/10; F01K 23/101; F01K 23/00; F01K 17/025; F01K 17/00;
(Continued)

(56) References Cited

U.S. PATENT DOCUMENTS

| 4,402,183 A | 9/1983 | Dimitroff et al. |
| 5,083,423 A | 1/1992 | Prochaska et al. |

(Continued)

FOREIGN PATENT DOCUMENTS

| AT | 007761 U1 | 8/2005 |
| CN | 102449288 | 5/2012 |

(Continued)

OTHER PUBLICATIONS

CN Application No. 201410599769.X; Office Action dated May 25, 2017; and translation; 10 pgs.
(Continued)

*Primary Examiner* — Steven M Sutherland
*Assistant Examiner* — Thuyhang N Nguyen
(74) *Attorney, Agent, or Firm* — Fletcher Yoder, P.C.

(57) ABSTRACT

A CCPP includes a gas turbine, a HRSG, a steam turbine a flash tank and first and second supply lines. The gas turbine, the HRSG and the steam turbine are interconnected to generate power. The gas turbine may include an air preheating system to preheat the air supplied in the gas turbine to enable expedite combustion therein. The flash tank is fluidically connected at a cold end of the HRSG to extract waste hot water from the cold end. Further, the first supply line is configured to interconnect the flash tank and the steam turbine to supply of flash steam to the steam turbine. Furthermore, the second supply line is configured to interconnect the flash tank and the air preheating system to supply hot flash condensate thereto.

20 Claims, 8 Drawing Sheets

(58) Field of Classification Search
CPC ....... F01K 21/005; Y02E 20/16; Y02E 20/14; F02C 6/18
See application file for complete search history.

(56) References Cited

U.S. PATENT DOCUMENTS

| | | | | |
|---|---|---|---|---|
| 5,251,432 A | * | 10/1993 | Bruckner | F01K 23/067 60/39.182 |
| 5,386,685 A | * | 2/1995 | Frutschi | F02C 6/18 60/39.182 |
| 5,647,199 A | * | 7/1997 | Smith | F01K 23/106 60/39.182 |
| 5,799,481 A | * | 9/1998 | Fetescu | F01K 17/025 60/39.182 |
| 5,904,039 A | * | 5/1999 | Bruckner | F01K 23/10 60/39.182 |
| 5,906,095 A | * | 5/1999 | Frutschi | F02C 6/003 60/39.182 |
| 6,223,523 B1 | | 5/2001 | Frutshi | |
| 6,240,718 B1 | * | 6/2001 | Fetescu | F01K 17/025 237/12.1 |
| 6,301,873 B2 | * | 10/2001 | Hannemann | F25J 3/046 60/39.12 |
| 6,405,525 B1 | * | 6/2002 | Droux | F01K 23/10 60/39.182 |
| 7,448,217 B2 | | 11/2008 | Savic et al. | |
| 2006/0254283 A1 | | 11/2006 | Savic et al. | |
| 2013/0341929 A1 | * | 12/2013 | Ho | F22B 27/00 60/671 |

FOREIGN PATENT DOCUMENTS

| | | |
|---|---|---|
| CN | 102852645 | 1/2013 |
| CN | 103026010 | 4/2013 |
| EP | 0931911 | 7/1999 |
| EP | 1921281 | 5/2008 |
| EP | 2256316 | 12/2010 |
| EP | 1584798 | 3/2011 |
| JP | 2003161164 | 6/2006 |
| WO | WO2011080576 | 7/2011 |

OTHER PUBLICATIONS

KR Application No. 10-2014-0147980; Office Action dated Sep. 22, 2020; 9 pgs.

* cited by examiner

COMBINED CYCLE POWER PLANT WITH IMPROVED EFFICIENCY

CROSS-REFERENCE TO RELATED APPLICATIONS

This application is a divisional of U.S. application Ser. No. 14/523,085 entitled "Combined Cycle Power Plant With Improved Efficiency" and filed Oct. 24, 2014, which claims priority to European Application No. 13191037.4 filed Oct. 31, 2013. Each of the foregoing applications is hereby incorporated by reference in its entirety.

TECHNICAL FIELD

The present disclosure relates to combined cycle power plants, and, more particularly, to an improvement in cycle arrangement for optimizing the combined cycle power plant efficiency.

BACKGROUND

In a combined cycle power plant (CCPP), a gas turbine and a steam turbine combinedly produce electric power. The CCPP is arranged so that the gas turbine is thermally connected to the steam turbine via a heat recovery steam generator (HRSG). The HRSG is a heat exchanger which utilizes waste exhaust gas of the gas turbine to heat feedwater for the steam generation process for operating the steam turbine. The optimum utilization of heat captured in the HRSG is one the major criteria to increase CCPP efficiency.

Despite of various conventional techniques to capture the heat in HRSG, there may be chances that the heat, especially, at cold end of the HRSG may be left unused. It therefore exists a need to optimally utilize the heat at the cold end of the HRSG in order to improve CCPP efficiency and output.

SUMMARY

The present disclosure describes an improvement in cycle arrangement for optimizing the combined cycle power plant efficiency and output, that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe an improved combined cycle power plant, which may be adaptable in terms of being improved in cycle arrangement for optimizing the combined cycle power plant efficiency. Further, object of the present disclosure is to describe a combined cycle power plant, which is convenient to use in an effective and economical way. Various other objects and features of the present disclosure will be apparent from the following detailed description and claims.

The above noted and other objects, in one aspect, may be achieved by an improved combined cycle power plant. The combined cycle power plant includes at least one gas turbine, at least one heat recovery steam generator, at least one steam turbine, at least one flash tank, and first and second supply lines. The at least one gas turbine is configured to produce gas to generate power and subsequently releasing the exhaust gas. The at least one gas turbine is configured to receive heated air from a gas turbine air preheating system for enabling efficient combustion of fuel to produce the gas. Further, the at least one heat recovery steam generator is thermally connected to the at least one gas turbine to use heat energy extracted from the exhaust gas of the at least one gas turbine to produce steam. Furthermore, the at least one steam turbine is thermally connected to the at least one heat recovery steam generator to utilize the steam produced by the at least one heat recovery steam generator to generate the power. The at least one flash tank fluidically connected at a cold end of the at least one heat recovery steam generator to extract hot water from the cold end. Connection to the cold end of a heat recovery steam generator means that the flash tank is connected to the exit of a heat exchanger pipe or pipe bundle which is arranged in the heat recovery steam generator closer to the downstream (cold) end than to the upstream (hot) end. For example the e.g. heat exchanger pipe or pipe bundle is arranged in the downstream half or downstream third of the heat recovery steam generator. Water is preheated in the cold end of the heat recovery steam generator relative to the extension of the heat recovery steam generator in flow direction of the flue gases passing through it. Moreover, the first supply line is configured to interconnect the at least one flash tank and the at least one steam turbine to enable supply of flash steam to the at least one steam turbine. The second supply line is configured to interconnect the at least one flash tank and the gas turbine air preheating system to enable supply of hot flash condensate to the gas turbine air preheating system.

In one embodiment of the present disclosure, the combined cycle power plant may include a feedwater preheating system thermally coupled to the cold end of the at least one heat recovery steam generator. This maintains the temperature requirement of feed water at the cold end of the heat recovery steam generator. In this embodiment, the hot water used for flashing purposes may be extracted from the feedwater preheating system.

In one further embodiment of the present disclosure, the combined cycle power plant may include a first bypass member to selectively bypass a part or all of the flash condensate from the second supply line for bypassing the gas turbine air preheating system.

In one further embodiment of the present disclosure, the combined cycle power plant may include a second bypass member to selectively bypass a part or all of the extracted hot water from the cold end of the heat recovery steam generator for bypassing the supply of the extracted hot water in to the at least one flash tank, and to serve as a recirculation system for heating the condensate at the at least one heat recovery steam generator to achieve a required minimum temperature.

In one further embodiment of the present disclosure, the combined cycle power plant may include at least one additional heat source fluidically connected the at least one flash tank to be utilized for additional hot water extraction to be supplied to the at least one flash tank.

In one further embodiment of the present disclosure, the combined cycle power plant may also include a provision for fuel gas preheating. In such embodiment, the combined cycle power plant may include a fuel gas preheating system configured to heat fuel to be supplied to the at least one gas turbine for effective combustion. In such configuration, the fuel gas preheating system is adapted to be configured in the second supply line to utilize the heat from the hot flash condensate to preheat the fuel to be supplied to the at least one gas turbine.

In one further embodiment, the combined cycle power plant a plurality of flash tanks, instead of one flash tank, is provided. The plurality of flash tanks is configured for hot water extraction and subsequently injecting the flash steam of varying pressure levels to a corresponding steam turbine stages.

In one further embodiment, the combined cycle power plant may also include at least one heat exchanger adapted to be configured to the second supply line. In such embodiment, the at least one heat exchanger is configured with the gas turbine air preheating system for preheating the air supplied in the gas turbine engine.

In yet further embodiment of the combined cycle power plant, the at least one gas turbine may preclude the gas turbine air preheating system, where heating is not required. Rather in this embodiment, the second supply line is configured to supply hot flash condensate from the at least one flash tank to a return line to the at least one heat recovery steam generator 120 or to the feedwater preheating system.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

Figure 1:
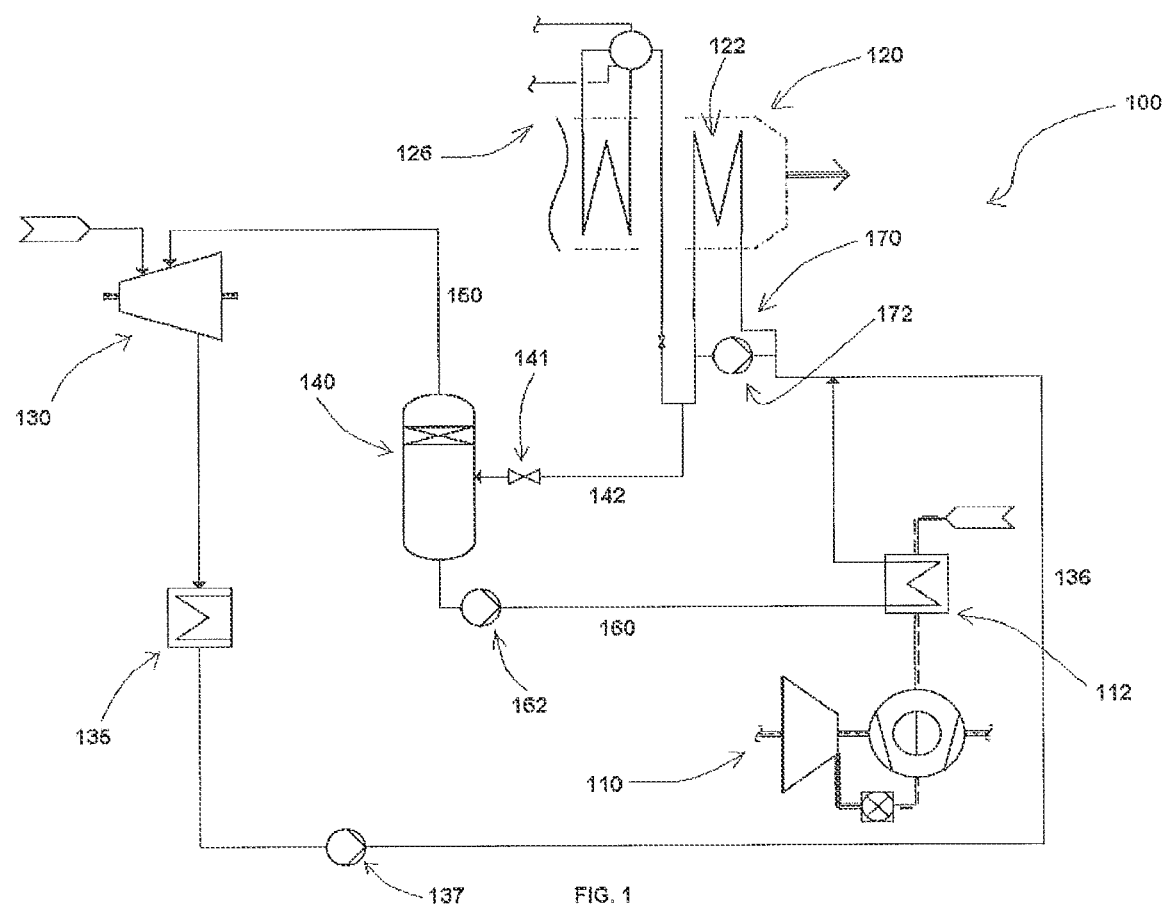
FIG. 1 illustrates an example line diagram of a Combined Cycle Power plant (CCPP) depicting a present invention incorporated therein, in accordance with an exemplary embodiment of the present disclosure.

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and apparatuses are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," and "second" and the like, herein do not denote any order, elevation or importance, but rather are used to distinguish one element from another. Further, the terms "a" and "an" herein do not denote a limitation of quantity, but rather denote the presence of at least one of the referenced item.

Referring now to FIGS. 1 to 7, examples of a Combined Cycle Power Plant (CCPP) 100 depicting various exemplary embodiments of the present invention incorporated therein. In as much as the construction and arrangement of the CCPP 100, various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 1 to 7, the CCPP 100, only those components are shown that are relevant for the description of various embodiments of the present disclosure.

Referring now to FIG. 1, the CCPP 100 for optimizing efficiency and output thereof includes at least one gas turbine 110, at least one heat recovery steam generator (HRSG) 120, at least one steam turbine 130, at least one flash tank 140 and first and second supply lines 150, 160. As conventionally, the at least one gas turbine 110 is thermally conjoined with the at least one steam turbine 130 via the HRSG 120 to generate the power output. Elaborately, as per present disclosure, the gas turbine 110 is configured to produce gas to generate power and subsequently releasing exhaust gas. The gas turbine 110 may include a gas turbine air preheating system 112 for preheating the air and supplying the heated air for enabling efficient combustion of the fuel to produce the gas in the gas turbine 110. Further, the HRSG 120 is thermally connected to the at least one gas turbine 110 to use heat energy extracted from the exhaust gas of the at least one gas turbine 110 to produce steam. Furthermore, the at least one steam turbine 130 is thermally connected to the HRSG 120 to utilize the steam to generate the power output.

As described, the HRSG 120 is a heat exchanger which utilizes waste exhaust gas of the gas turbine 110 to produce steam for operating the steam turbine. The optimum utilization of heat captured in the HRSG 120 is one the major criteria to increase the CCPP 100 efficiency. However, despite of various conventional techniques to capture the heat in the HRSG 120, there may be chances that the heat, especially, at a cold end 122 of the HRSG 120 may be left unused. the CCPP 100 of the present invention therefore includes the at least one flash tank 140 to optimally utilize the heat at the cold end 122 of the HRSG 120 in order to improve the CCPP 100 efficiency and power output. In as much as the construction and arrangement of the HRSG 120, various associated elements may be well-known to those skilled in the art, and it is deemed sufficient to simply note that as shown in FIGS. 1 to 7, in the HRSG 120, only those components are shown that are relevant for the description of various embodiments of the present disclosure.

As shown in FIG. 1, the flash tank 140 is fluidically connected, via a supply line 142, at the cold end 122 of the HRSG 120 to extract unused hot water from the cold end 122. A flash valve 141 may be incorporated to control extraction. In one embodiment of the present disclosure, the CCPP 100 may include a feedwater preheating system 170 thermally coupled to the cold end 122 of the HRSG 120 to maintain the temperature requirement of the feed water at the cold end 120. Also in such embodiment, the flash tank 140 is fluidically connected at the cold end 122 of the HRSG 120 through the feedwater preheating system 170 in order to extract unused hot water of the cold end 122 via the feedwater preheating system 170. A recirculation system 172 may be enabled to the feedwater preheating system 170 for cooperating thereto. Furthermore, a Low Pressure (LP) drum 126 may also be operative in conjunction to the feedwater preheating system 170.

The flash tank 140 having the extracted hot water may direct therefrom for being utilized in the most optimized way in order to increase the efficiency of the CCPP 100. For the said purpose, the CCPP 100 includes the first and second supply lines 150, 160.

The first supply line 150 is configured to interconnect the flash tank 140 and the steam turbine 130 to enable supply of flash steam thereto. The flash steam from the first supply line 150 may be injected to the steam turbine 130, more specifically, to a Low Pressure (LP) steam turbine, to generate an additional power, apart from the power generated in conventional CCPP cycle, in order to increase the efficiency and output of the CCPP 100 and thereafter is supplied back to the HRSG 120 via a return line 136 through a pump 137 via passing through a condenser 135.

Further, the second supply line 160 is configured to interconnect the flash tank 140 and the gas turbine air preheating system 112 to enable supply of hot flash condensate in the flash tank 140 to the gas turbine air preheating system 112 to preheat the air to supply the preheated air to the gas turbine 110 for enabling expedite combustion. A pump 162 may be configured in the second supply line 160 to achieve the target. Further, the cold condensate therefrom may be returned to the return line 136 and resupplied to the HRSG 120 for reoperation. The second supply line 160 enables the provision of preheating the air supplied in the gas turbine 110, thereby replacing the requirement of external source to preheat the fuel air in turn increasing the efficiency of the CCPP 100. Further, the said provision of air preheating of the present invention precludes complex piping and heat exchanger arrangements as required in the conventional CCPP, making the present system simple and cost effective.

The CCPP 100 as depicted in FIG. 1, as per various embodiments, may be modified to different plant configurations. FIGS. 2 to 7 depict various such variants of the CCPP 100, and will be described herein in conjunction to FIG. 1. In FIGS. 2 to 7 only those reference numerals with corresponding components are inserted where the variant are depicted, and the remaining components are left unnumbered in order to highlight the various variant, and that the all unnumbered components shall be read or referred from FIG. 1.

Figure 2:
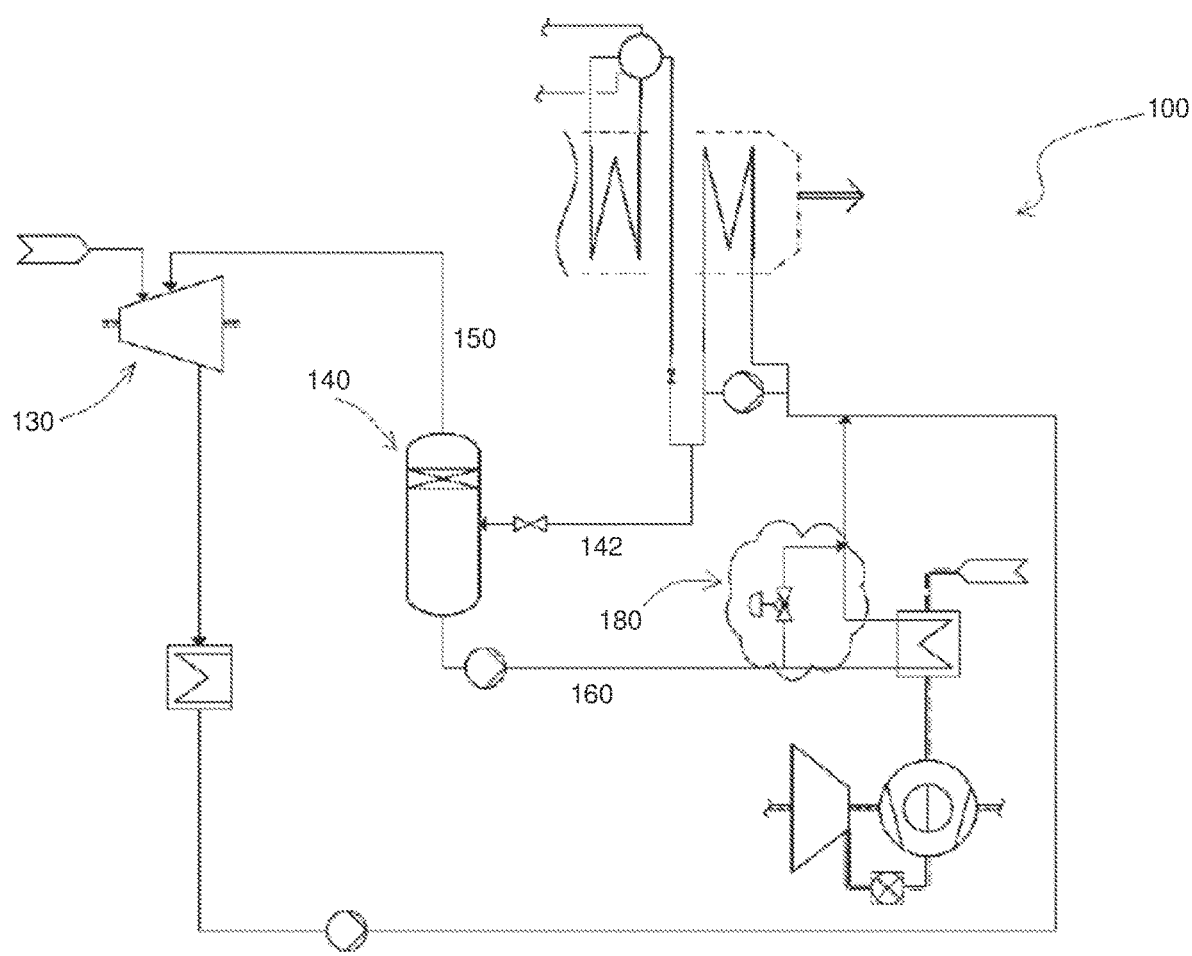
FIG. 2 illustrates another example embodiment depicting a first variant of the CCPP of FIG. 1.

As per the first variant, as shown in FIG. 2, the CCPP 100 may include a first bypass member 180 to selectively bypass a part or all of the flash condensate from the second supply line 160 for bypassing the gas turbine air preheating system 112.

Figure 3:
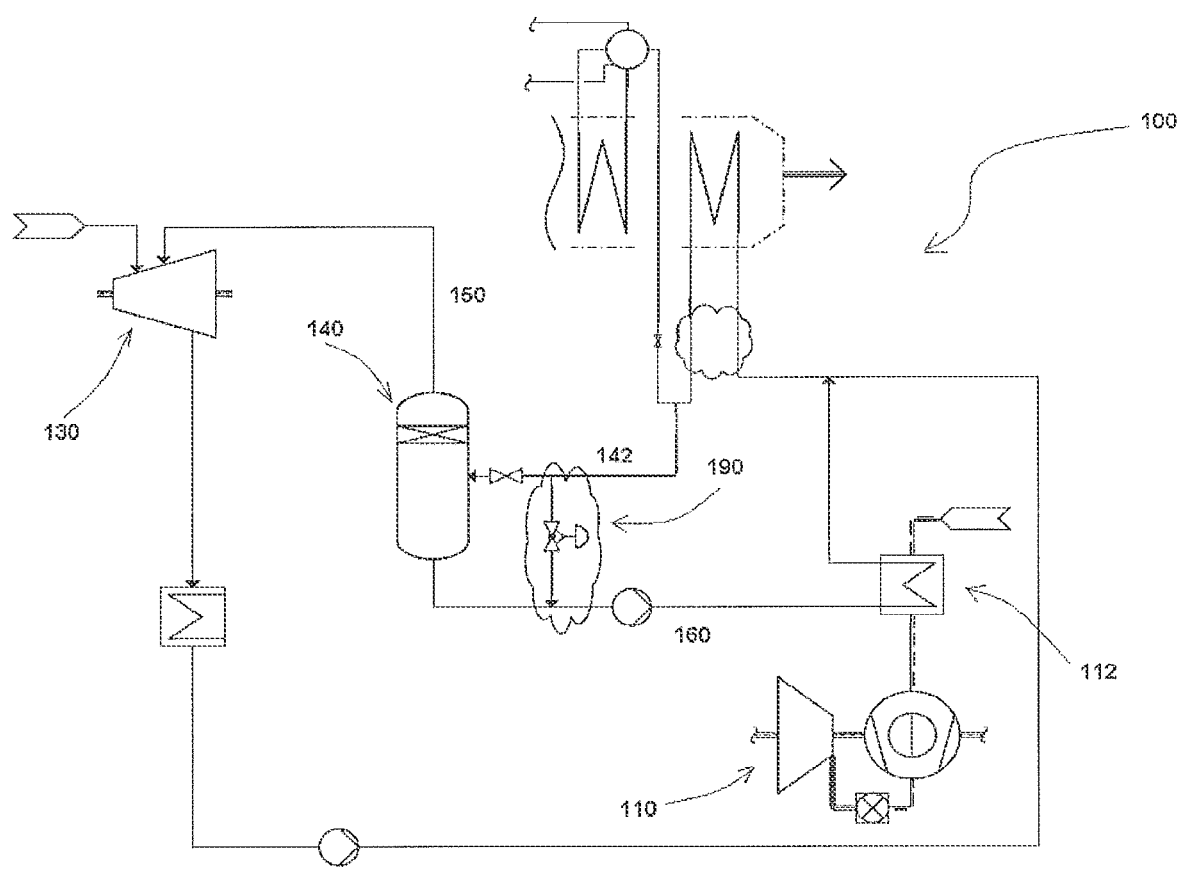
FIG. 3 illustrates another example embodiment depicting a second variant of the CCPP of FIG. 1.

As per the second variant, as shown in FIG. 3, the CCPP 100 may include a second bypass member 190 to selectively bypass a part or all of the extracted hot water from the cold end 122 for bypassing the supply of the extracted hot water in to the flash tank 140. This serve as a recirculation system for heating the condensate to the HRSG 120 to achieve a required minimum HRSG inlet temperature. In such arrangement, the recirculation system 172 may be precluded, as shown in FIG. 3.

Figure 4:
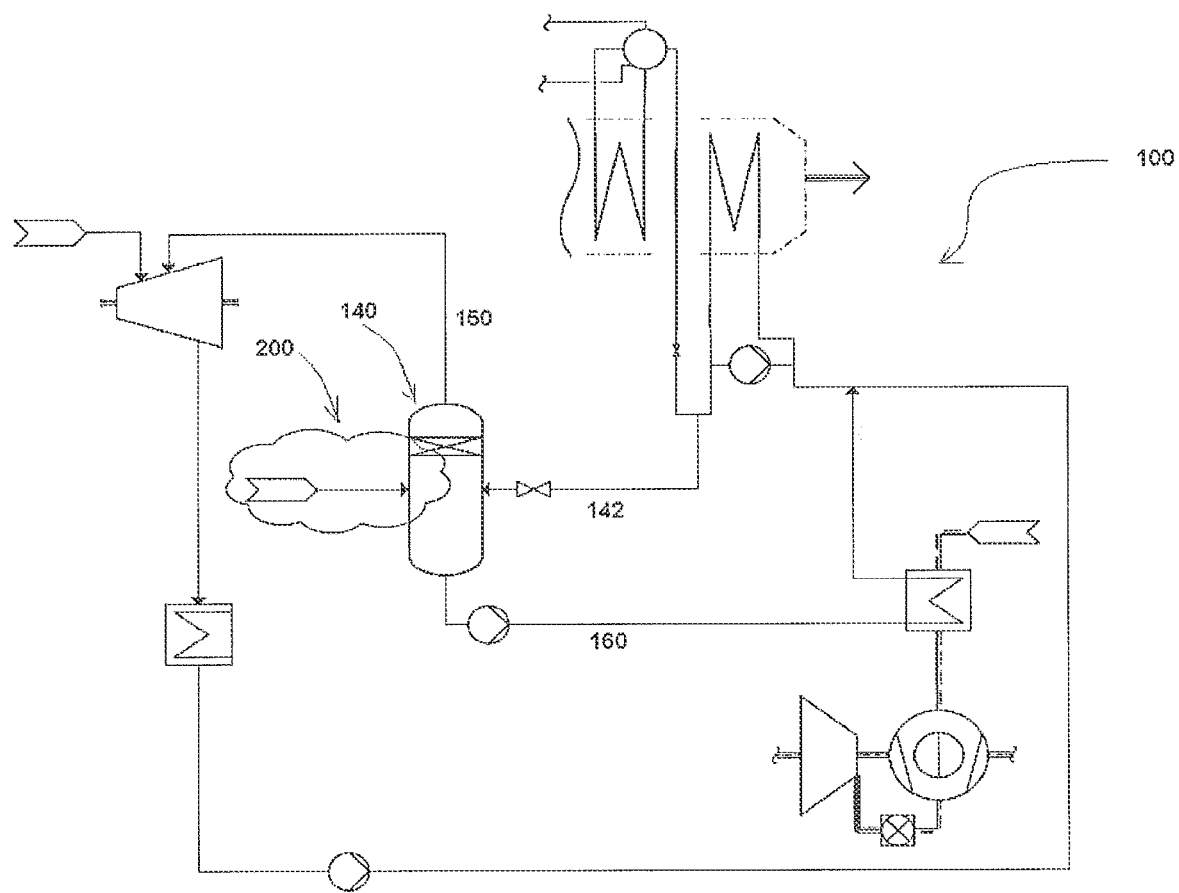
FIG. 4 illustrates another example embodiment depicting a third variant of the CCPP of FIG. 1.

As per the third variant, as shown in FIG. 4, the CCPP 100 may include at least one additional heat source 200 fluidically connected the flash tank 140 to be utilized for additional hot water extraction to be supplied to the flash tank 140. The additional heat source 200 may include condensate return from a carbon capture unit or a district heating unit. However, without departing from the scope of the present disclosure, the additional heating source may be any other as known in the art.

Figure 5:
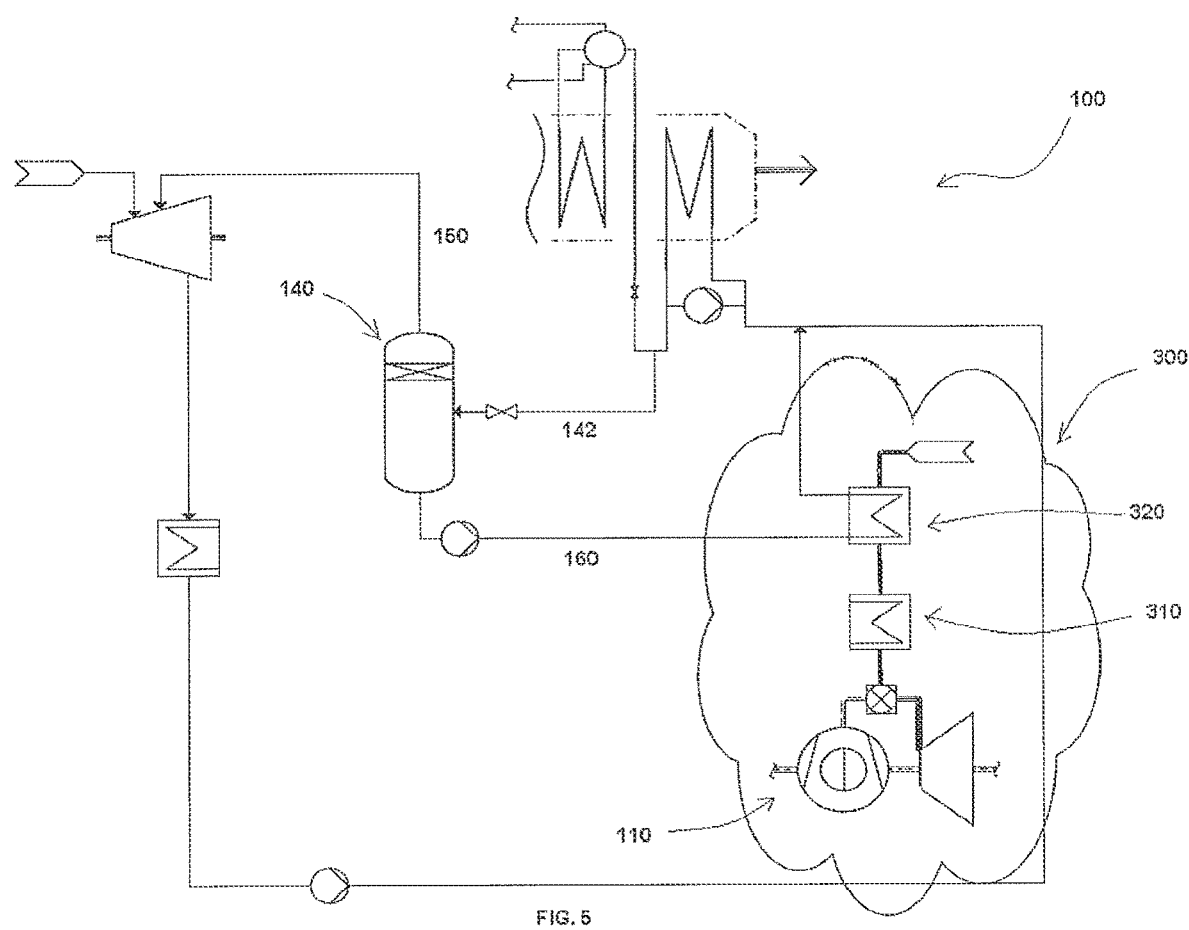
FIG. 5 illustrates another example embodiment depicting a fourth variant of the CCPP of FIG. 1.

As per the fourth variant, as shown in FIG. 5, the CCPP 100 may include a fuel gas preheating system 300 configured to heat fuel to be supplied to the gas turbine 110 for effective combustion. The fuel gas preheating system 300 is adapted to be configured in the second supply line 160 to utilize the heat from the hot flash condensate to preheat the fuel to be supplied to the gas turbine 110. For example, at least one heat exchanger, such as 310, may be configured in series with a heat exchanger 320 of the second supply line 160 for enabling the heat to be supplied to preheat the fuel gas at the fuel gas preheating system 300 as and when required full temperature, normally 150-300° C., is not generated by the hot flash condensate of the second supply line 160.

Figure 6:
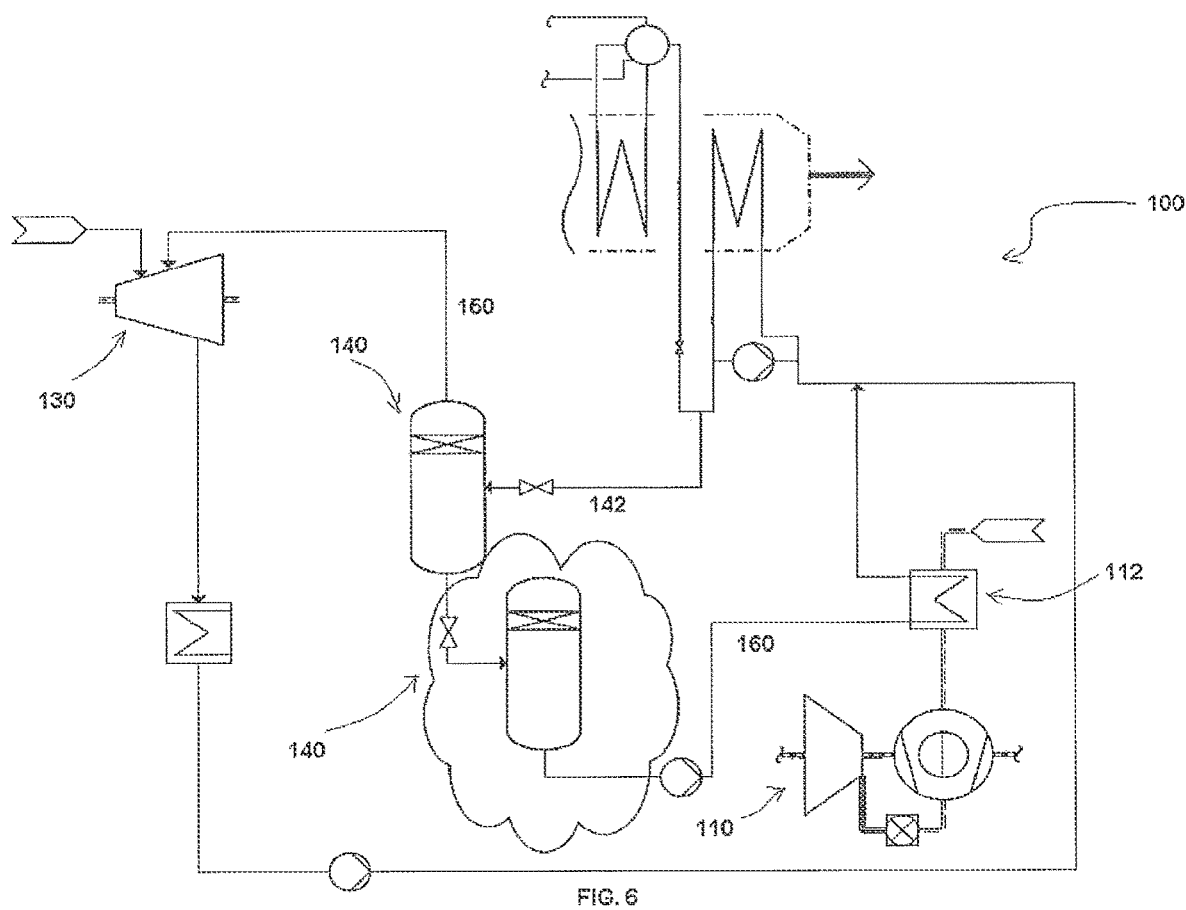
FIG. 6 illustrates another example embodiment depicting a fifth variant of the CCPP of FIG. 1.
Figure 7:
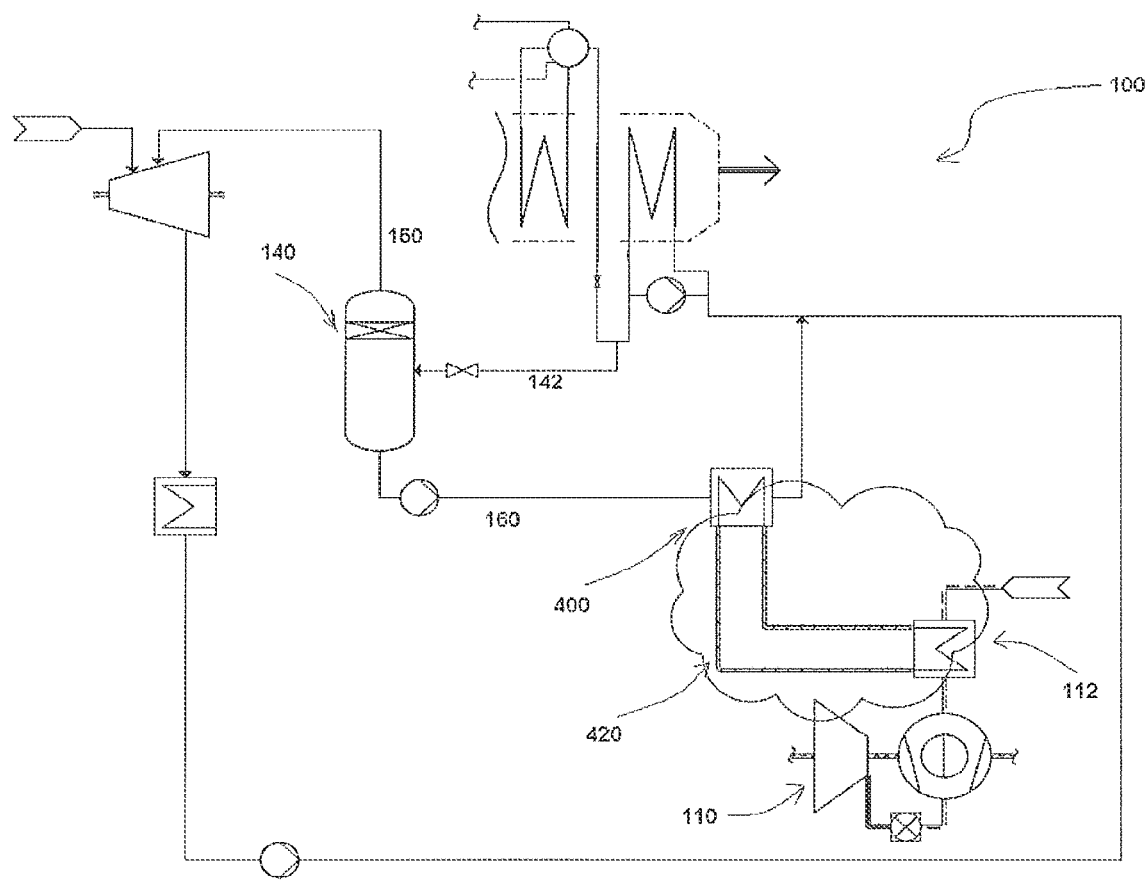
FIG. 7 illustrates another example embodiment depicting a sixth variant of the CCPP of FIG. 1.

In one other variant, fifth, as shown in FIG. 6, the CCPP 100 may include a plurality of flash tanks 140 as against one flash tank 140. The plurality of flash tanks 140 is adapted to work in cascading configuration, using as hot source the hot water from the cold end 122 of the HRSG 120, flashing at different pressures and subsequently injecting the flash steam of varying pressure levels to corresponding steam turbine stages In one further variant, sixth, as shown in FIG. 7, at least one heat exchanger 400 adapted to be configured to the second supply line 160. As shown, the at least one heat exchanger 400 is configured in an intermediate heat transfer loop 420 with the gas turbine air preheating system 112 for preheating the air supplied in the gas turbine 110.

Figure 8:
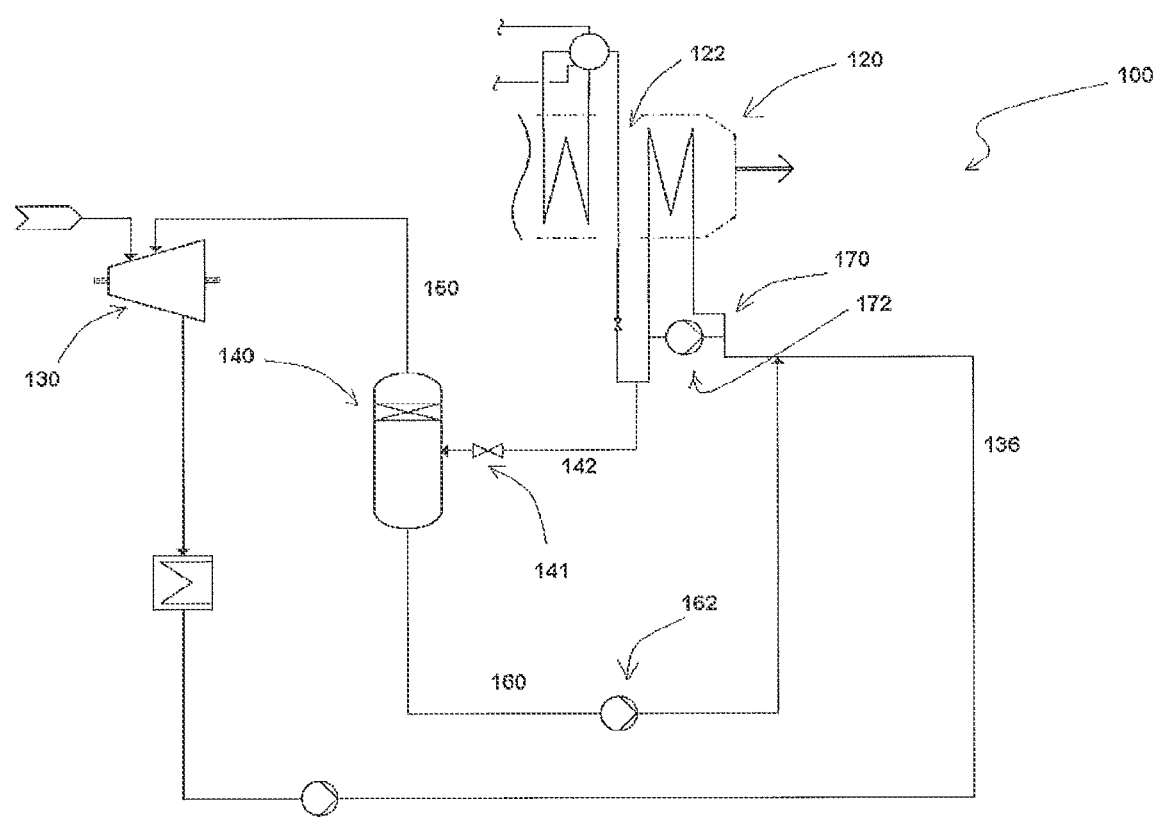
FIG. 8 illustrates yet another example embodiment depicting a seventh variant of the CCPP where a gas turbine precludes an air preheating system.

In yet another variant, seventh, as shown in FIG. 8, of the CCPP 100, the at least one gas turbine 110 may preclude the gas turbine air preheating system 112 as provided in the above embodiments. Rather in this embodiment, the second supply line 160 is configured to supply hot flash condensate from the at least one flash tank 140 to the return line 136 to the at least one heat recovery steam generator 120 or to the feedwater preheating system 170. Valves 141 may be configured to control respective supply of the hot water and condensate.

The invention of the present disclosure is advantageous in various scopes. This provides an improved CCPP, which may capture the heat in the HRSG, especially, at the cold end of the HRSG that may be left unused in most optimal way in order to improve CCPP efficiency and output. Further, the CCPP with such variants is convenient to use and economical. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A system, comprising:
   a heat recovery steam generator (HRSG) configured to recover heat from an exhaust gas, wherein the HRSG defines an exhaust flow path of the exhaust gas and comprises a plurality of heat exchangers at different positions within the exhaust flow path relative to a direction of flow along the exhaust flow path, the plurality of heat exchangers including a last heat exchanger relative to the direction of flow, wherein the last heat exchanger is configured to transfer heat from the exhaust gas into water to produce a heated water;
   a steam turbine thermally connected to the HRSG;
   a flash tank fluidly coupled to the last heat exchanger in the HRSG, wherein the flash tank is configured to receive the heated water from the last heat exchanger, and the flash tank is configured to flash the heated water to supply a flash steam to the steam turbine;
   a first supply line interconnecting the flash tank and the steam turbine to enable flow of the flash steam from the flash tank to the steam turbine;
   a return line interconnecting the steam turbine and the last heat exchanger in the HRSG, wherein the return line is configured to enable flow of the flash steam from the steam turbine toward the last heat exchanger in the HRSG; and
   a second supply line interconnecting the flash tank and the return line to enable flash condensate to flow from the flash tank to the return line, wherein a junction between the second supply line and the return line is positioned upstream of the flash tank.

2. The system of claim 1, wherein the heated water received by the flash tank is heated only by the exhaust gas in the HRSG.

3. The system of claim 1, comprising a heated water conduit interconnecting the flash tank and the last heat exchanger.

4. The system of claim 1, comprising a flash valve disposed between the last heat exchanger and the flash tank, wherein the flash valve is configured to control supply of the heated water to the flash tank.

5. The system of claim 1, comprising a gas turbine configured to output the exhaust gas to the HRSG.

6. The system of claim 1, comprising a condenser disposed along the return line downstream from the steam turbine.

7. The system of claim 6, comprising a first pump disposed along the return line downstream from the condenser.

8. The system of claim 7, comprising a second pump disposed along the second supply line downstream from the flash tank.

9. A system, comprising:
   a heat recovery steam generator (HRSG) configured to recover heat from an exhaust gas, wherein the HRSG defines an exhaust flow path of the exhaust gas and comprises a plurality of heat exchangers at different positions within the exhaust flow path relative to a direction of flow along the exhaust flow path, the plurality of heat exchangers including a last heat exchanger relative to the direction of flow, wherein the last heat exchanger is configured to transfer heat from the exhaust gas into water to produce a heated water;
   a feedwater preheating system thermally coupled to the last heat exchanger, wherein the feedwater preheating system is configured to control a temperature of the water at the last heat exchanger;
   a steam turbine thermally connected to the HRSG;
   a flash tank fluidly coupled to the last heat exchanger in the HRSG, wherein the flash tank is configured to receive the heated water from the last heat exchanger, and the flash tank is configured to flash the heated water to supply a flash steam to the steam turbine;
   a first supply line interconnecting the flash tank and the steam turbine to enable flow of the flash steam from the flash tank to the steam turbine;
   a return line interconnecting the steam turbine and the last heat exchanger in the HRSG, wherein the return line is configured to enable flow of the flash steam from the steam turbine toward the last heat exchanger in the HRSG; and
   a second supply line interconnecting the flash tank and the feedwater preheating system to enable flash condensate to flow from the flash tank to the feedwater preheating system, wherein the feedwater preheating system is configured to receive thermal energy from the flash condensate to control the temperature of the water at the last heat exchanger.

10. The system of claim 9, comprising a flash valve disposed between the last heat exchanger and the flash tank, wherein the flash valve is configured to control supply of the heated water to the flash tank.

11. The system of claim 9, comprising a gas turbine configured to output the exhaust gas to the HRSG.

12. The system of claim 9, comprising a condenser disposed along the return line downstream from the steam turbine.

13. The system of claim 12, comprising a first pump disposed along the return line downstream from the condenser.

14. The system of claim 13, comprising a second pump disposed along the second supply line downstream from the flash tank.

15. The system of claim 9, wherein the flash tank is configured to receive the heated water from the last heat exchanger via the feedwater preheating system.

16. A system, comprising:

a heat recovery steam generator (HRSG) configured to recover heat from an exhaust gas, wherein the HRSG comprises a plurality of heat exchangers disposed within an exhaust flow path of the exhaust gas at different positions in a direction of flow along the exhaust flow path, and a last heat exchanger of the plurality of heat exchangers in the direction of flow is configured to transfer heat from the exhaust gas into water to produce a heated water;

a steam turbine thermally connected to the HRSG;

a flash tank fluidly coupled to the last heat exchanger in the HRSG, wherein the flash tank is configured to receive the heated water from the last heat exchanger, and the flash tank is configured to flash the heated water to supply a flash steam to the steam turbine;

a first supply line interconnecting the flash tank and the steam turbine to enable flow of the flash steam from the flash tank to the steam turbine;

a second supply line interconnecting the flash tank and a gas turbine air preheating system to enable flash condensate to flow from the flash tank to the gas turbine air preheating system;

a first return line interconnecting the steam turbine and the last heat exchanger in the HRSG, wherein the first return line is configured to enable flow of the flash steam from the steam turbine toward the last heat exchanger in the HRSG; and a second return line interconnecting the gas turbine air preheating system and the first return line, wherein the second return line is configured to enable flow of the flash condensate from the gas turbine air preheating system to the first return line, and a junction between the second return line and the first return line is positioned upstream of the flash tank.

17. The system of claim 16, comprising a conduit/valve assembly fluidly coupled to the second supply line, wherein the conduit/valve assembly is configured to selectively enable bypassing of part or all of the heated water supplied to the flash tank by the last heat exchanger, and the conduit/valve assembly is configured to enable flow of bypassed heated water to the second supply line.

18. The system of claim 17, comprising a heated water conduit interconnecting the flash tank and the last heat exchanger, wherein the conduit/valve assembly is fluidly coupled to the heated water conduit.

19. The system of claim 16, comprising a heat source fluidly coupled to the flash tank, wherein the heat source is configured to supply additional heated water to the flash tank.

20. The system of claim 16, comprising a gas turbine configured to output the exhaust gas to the HRSG.

* * * * *